United States Patent
Vuskovic et al.

(10) Patent No.: US 11,381,409 B2
(45) Date of Patent: Jul. 5, 2022

(54) PROACTIVE PROVISION OF NEW CONTENT TO GROUP CHAT PARTICIPANTS

(71) Applicant: Google LLC, Mountain View, CA (US)

(72) Inventors: Vladimir Vuskovic, Zollikerberg (CH); Yariv Adan, Cham (CH)

(73) Assignee: GOOGLE LLC, Mountain View, CA (US)

( * ) Notice: Subject to any disclaimer, the term of this patent is extended or adjusted under 35 U.S.C. 154(b) by 16 days.

(21) Appl. No.: 16/927,373

(22) Filed: Jul. 13, 2020

(65) Prior Publication Data
US 2020/0344082 A1    Oct. 29, 2020

Related U.S. Application Data

(63) Continuation of application No. 15/637,640, filed on Jun. 29, 2017, now Pat. No. 10,742,435.

(51) Int. Cl.
*H04L 12/18* (2006.01)
*H04L 51/02* (2022.01)
(Continued)

(52) U.S. Cl.
CPC ........ *H04L 12/1827* (2013.01); *G06F 16/00* (2019.01); *G06F 40/40* (2020.01);
(Continued)

(58) Field of Classification Search
CPC ....... H04L 51/02; H04L 51/16; H04L 51/063; H04L 67/306; H04L 65/1093; H04L 12/1813
See application file for complete search history.

(56) References Cited

U.S. PATENT DOCUMENTS 6,731,307 B1    5/2004  Strubbe et al.
8,612,226 B1   12/2013  Epstein et al.
(Continued)

FOREIGN PATENT DOCUMENTS

CN    101588323    11/2009
CN    102792320    11/2012
(Continued)

OTHER PUBLICATIONS

European Patent Office; Intention to Grant issued in Application No. 18749908.2; 48 pages; dated Oct. 13, 2020.
(Continued)

*Primary Examiner* — Tom Y Chang
(74) *Attorney, Agent, or Firm* — Middleton Reutlinger

(57) ABSTRACT

Techniques are described herein for automated assistants that proactively provide content to participant(s) of multi-participant message exchange threads (e.g., group chats, audio and/or video calls in which oral messages are transcribed for analysis, etc.) based on signals such as individual participant profiles associated with participant(s). In various implementations, automated assistant(s) that may not be explicitly invoked may analyze content of a message exchange thread involving multiple human participants and/or document(s) associated with the message exchange thread. Based on the analyzing, the automated assistant(s) may identify topic(s) pertinent to the message exchange thread. Based on individual participant profiles associated with the participants, the automated assistant(s) may identify shared interest(s) of the participants. The automated assistant(s) may then select new content based both on the pertinent topic(s) and the shared interest(s) of the participants and proactively provide the new content to one or more of the participants.

16 Claims, 6 Drawing Sheets

(51) Int. Cl.
*G06F 40/40* (2020.01)
*G06F 16/00* (2019.01)
*G06Q 10/00* (2012.01)
*H04L 51/00* (2022.01)
*G06Q 10/06* (2012.01)
*H04L 65/4038* (2022.01)
*H04L 67/75* (2022.01)

(52) U.S. Cl.
CPC ......... *G06Q 10/00* (2013.01); *H04L 12/1813* (2013.01); *H04L 51/02* (2013.01); *G06Q 10/06* (2013.01); *H04L 51/16* (2013.01); *H04L 65/4038* (2013.01); *H04L 67/36* (2013.01)

(56) References Cited

U.S. PATENT DOCUMENTS

| | | | |
|---|---|---|---|
| 9,117,447 | B2 | 8/2015 | Gruber et al. |
| 9,368,114 | B2 | 6/2016 | Larson et al. |
| 9,865,260 | B1 | 1/2018 | Vuskovic et al. |
| 10,636,418 | B2 | 4/2020 | Badr et al. |
| 2004/0162724 | A1 | 8/2004 | Hill et al. |
| 2005/0054381 | A1 | 3/2005 | Lee et al. |
| 2005/0131695 | A1 | 6/2005 | Lucente et al. |
| 2007/0201636 | A1 | 8/2007 | Gilbert et al. |
| 2008/0115068 | A1 | 5/2008 | Smith |
| 2008/0189110 | A1 | 8/2008 | Freeman et al. |
| 2009/0150156 | A1 | 6/2009 | Kennewick et al. |
| 2010/0088100 | A1 | 4/2010 | Lindahl |
| 2010/0205541 | A1* | 8/2010 | Rapaport .............. G06F 16/285 715/753 |
| 2010/0217657 | A1 | 8/2010 | Gazdzinski |
| 2010/0241963 | A1 | 9/2010 | Kulis et al. |
| 2010/0250672 | A1 | 9/2010 | Vance et al. |
| 2011/0066634 | A1 | 3/2011 | Phillips et al. |
| 2011/0271194 | A1 | 11/2011 | Lin et al. |
| 2012/0290950 | A1* | 11/2012 | Rapaport ........... H04N 21/8358 715/753 |
| 2013/0110505 | A1 | 5/2013 | Gruber et al. |
| 2013/0159377 | A1 | 6/2013 | Nash |
| 2013/0178388 | A1 | 7/2013 | Roudier et al. |
| 2013/0275164 | A1 | 10/2013 | Gruber et al. |
| 2013/0317823 | A1 | 11/2013 | Mengibar |
| 2014/0129651 | A1 | 5/2014 | Gelfenbeyn et al. |
| 2014/0229471 | A1* | 8/2014 | Galvin, Jr. .............. G06F 16/30 707/725 |
| 2014/0236953 | A1* | 8/2014 | Rapaport .............. G06Q 10/10 707/740 |
| 2014/0278400 | A1 | 9/2014 | Coussemaeker et al. |
| 2014/0310001 | A1 | 10/2014 | Kalns et al. |
| 2015/0046147 | A1 | 2/2015 | Waibel et al. |
| 2015/0169284 | A1 | 6/2015 | Quast et al. |
| 2015/0169336 | A1 | 6/2015 | Harper et al. |
| 2015/0254058 | A1 | 9/2015 | Klein et al. |
| 2015/0269612 | A1 | 9/2015 | Cucerzan |
| 2016/0321573 | A1 | 3/2016 | Vangala et al. |
| 2016/0294739 | A1 | 10/2016 | Stoehr et al. |
| 2016/0373891 | A1* | 12/2016 | Ramer .................. H04W 4/024 |
| 2017/0006356 | A1 | 1/2017 | Krasadakis |
| 2017/0076327 | A1* | 3/2017 | Filippini .............. G06F 16/954 |
| 2017/0083628 | A1 | 3/2017 | Frenkel et al. |
| 2017/0180276 | A1 | 6/2017 | Gershony et al. |
| 2018/0053114 | A1* | 2/2018 | Adjaoute ........... G06Q 20/4016 |
| 2018/0061421 | A1 | 3/2018 | Sarikaya |
| 2018/0068656 | A1 | 3/2018 | Lehman et al. |
| 2018/0082682 | A1* | 3/2018 | Erickson ............... B64C 39/024 |
| 2018/0098030 | A1* | 4/2018 | Morabia ............. H04L 65/1089 |
| 2018/0137856 | A1 | 5/2018 | Gilbert |
| 2018/0183748 | A1* | 6/2018 | Zhang ................. H04L 67/2833 |
| 2018/0373405 | A1* | 12/2018 | Donahue ............... G06F 16/435 |

FOREIGN PATENT DOCUMENTS

| | | |
|---|---|---|
| CN | 102947823 | 2/2013 |
| CN | 103577531 | 2/2014 |
| CN | 104603830 | 5/2015 |
| CN | 105359138 | 2/2016 |
| CN | 106020488 | 10/2016 |
| CN | 106559321 | 4/2017 |
| EP | 2884409 | 6/2015 |
| JP | 2001188784 | 12/1999 |
| JP | 2003108191 | 4/2003 |
| JP | 2005167628 | 6/2005 |
| JP | 2009116552 | 5/2009 |
| JP | 2015156231 | 8/2015 |
| KR | 20130000423 | 1/2013 |
| WO | 2011088053 | 7/2011 |
| WO | 2015187048 | 12/2015 |

OTHER PUBLICATIONS

European Patent Office; Communication issued in Application No. 20213009.2; 9 pages; dated Mar. 19, 2021.
Japanese Patent Office: Office Action issued in Application No. 2019-552127 dated Nov. 2, 2020.
Koshino et al., Spoken Dialogue System Using Information Extraction from the Web (No. 82, pp. 1-6), Information Processing Society of Japan, Spoken Language Processing (SLP) dated Oct. 15, 2010.
Koshino et al., Spoken Dialogue System Based on Information Extraction and Presentation Using Similarity of Predicate Argument Structures (vol. 52, No. 12, pp. 3386-3397), Journal of Information Processing Society of Japan dated Dec. 15, 2011.
Japanese Patent Office: Office Action issued for Application No. 2019-560296 dated Nov. 2, 2020.
Koshino et al., "Spoken Dialogue System based on Information Extraction from Web Text" The Special Interest Group Technical Reports of IPSJ Spoken Language Information Processing (SLP) No. 82, Aug. 15, 2010, pp. 1-6.
China National Intellectual Property Administration; Notification of First Office Action issued in Application No. 201880035874.7; 21 pages; dated Apr. 26, 2021.
The European Patent Office; Examination Report issued in Application No. 18749908.2 dated Sep. 27, 2019.
European Patent Office; International Search Report and Written Opinion of PCT Ser. No. PCT/US2018/040057; 15 pages; dated Sep. 28, 2018.
"Bots: An introduction for developers;" 13 sheets [online] [found on May 15, 2017], available in the Internet as URL: https://core.telegram.org/bots.
Constine, Josh "Facebook will launch group chatbots at F8;" Posted Mar. 29, 2017, TechCrunch, 9 sheets [online] [found on May 15, 2017], available in the Internet as URL: https://techcrunch.com/2017/03/29/facebook-group-bots/.
McHugh, Molly "Slack is Overrun with Bots. Friendly, Wonderful Bots;" Aug. 21, 2015, Then One/Wired, 10 sheets [online] [found on May 15, 2017], available in the Internet as URL: https://www.wired.com/2015/08/slack-overrun-bots-friendly-wonderful-bots/.
Metz, Rachel "Messaging App Adds and Assistant to the Conversation;" Apr. 4, 2014, MIT Technology Review, 9 sheets [online] [found on May 15, 2017], available in the Internet as URL: https://www.technologyreview.com/s/525991/messaging-app-adds-an-assistant-to-the-conversation/.
Becker, Christian, et al. "Simulating the Emotion Dynamics of a Multimodal Conversational Agent." In Tutorial and Research Workshop on Affective Dialogue Systems, pp. 154-165. Springer Berlin Heidelberg, 2004.
L'Abbate, Marcello. "Modelling Proactive Behaviour of Conversational Interfaces." PhD diss., Technische Universität; 170 pages. 2006.
Minker, W., et al. "Next-generation human-computer interfaces—towards intelligent, adaptive and proactive spoken language dialogue systems." In Intelligent Environments, 2006. IE 06. 2nd IET International Conference on (vol. 1, pp. 213-219). IET.
China National Intellectual Property Administration: Notice of Grant issued for Application No. 201880035874.7 dated Jan. 4, 2022. 4 pages.

* cited by examiner

PROACTIVE PROVISION OF NEW CONTENT TO GROUP CHAT PARTICIPANTS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using spoken natural language input (i.e. utterances) which may in some cases be converted into text and then processed, and/or by providing textual (e.g., typed) natural language input.

In many cases, multiple users may communicate with each other by exchanging messages in message exchange threads (often referred to as "group chats"). Each user may incorporate messages into the message exchange thread by typing text or by providing spoken input (which may be converted to text prior to incorporation). Some message exchange threads may be formed from textual group chats where all or most of the participants provide textual input into, for example, a message exchange client. Other message exchange threads may be formed from oral conversations between multiple participants, e.g., as part of voice conferences and/or video conferences.

It is possible to invite or invoke automated assistants sometimes referred to as "bots" to join group chats. The bots—which in some cases may take the form of automated assistants configured for particular domains (sports, politics, science, news, weather, hobbies, interests, etc.)—may reactively and/or proactively incorporate various content into the thread, based on the content of the message exchange thread itself (i.e., the messages exchanged between the users) or based on publicly available information. However, the bots typically have, at most, access to the content of the message exchange thread (i.e., the messages exchanged between the users) and other publicly available information that may or may not be limited to their respective domains. This limits the type of content they are able to proactively incorporate into the group chat, particularly early on in the lifetime of the group chat when there may be limited conversational content from which to identify topics.

Some "general purpose" ("GP") automated assistants may include GP automated assistant "clients" that are installed locally on client devices and that are interacted with directly by users, as well as cloud-based counterpart(s) that leverage the virtually limitless resources of the cloud to cooperate with automated assistant clients respond to users' requests. For example, the GP automated assistant client may provide, to the cloud-based counterpart(s), an audio recording of the user's voice input (or a text conversion thereof) and data indicative of the user's identity (e.g., credentials). The cloud-based counterpart may perform various processing on the input to return various results to the GP automated assistant client, which may then provide corresponding output to the user (or take some other action). For the sakes of brevity and simplicity, the term "GP automated assistant," when described herein as "serving" a particular user, may refer to the GP automated assistant client installed on the particular user's client device and any cloud-based counterpart that interacts with the GP automated assistant client to respond to the user's queries. The more general term "automated assistant" may refer more generally to any software process that receives natural language input and provides natural language output in response, such as one of the aforementioned domain-specific bots and/or a GP automated assistant.

In some cases, a GP automated assistant may have access to publicly-available data such as documents and other information available on the Internet, as well as "user-controlled resources" under the control of a particular user served by the automated assistant. User-controlled resources may be associated with a "user account" of the user, and may be locally accessible from client device(s) operated by the user and/or remotely (e.g., in the so-called "cloud"). User-controlled resources may take various forms, such as a user's calendar, emails, text messages, reminders, shopping lists, search history, browsing history, photos, documents, sensor data (e.g., position coordinates), content of past human-to-computer dialogs, personal preferences, and so forth.

SUMMARY

Techniques are described herein for implementing automated assistants that proactively provide content to participants of multi-participant message exchange threads (e.g., group chats, audio and/or video calls in which oral messages are converted into text for analysis, etc.) based on signals such as individual participant profiles associated with one or more participants. In various implementations, each participant may be associated with the aforementioned individual participant profile, which may be associated with (e.g., include) information related to the participant and/or controlled by the participant. For example, participant's individual participant profile may include user-controlled resources related to the participant, such as the participant's search history, browsing history, location history (e.g., determined from multiple position coordinates obtained over time), personal documents, emails, calendar entries, reminder lists, prior contributions to other message exchange threads, prior exchanges with an automated assistant, prior consumption of proactively provided content (e.g., did the user ignore, swipe away, or otherwise reject proactively provided content?), etc.

In some implementations, and particularly in the early stages of a group chat, an automated assistant may identify, based on individual participant profiles associated with one or more participants in the group chat, one or more shared interests of the participants. In some cases, the automated assistant may also analyze content of the group chat to identify one or more topics of discussion. In various implementations, the automated assistant may use the shared interests, alone or in combination with the topics, to select new content to be proactively provided to the participants, e.g., by being incorporated into the group chat. Notably, the automated assistant need not be explicitly invoked or invited to join the group chat; hence, the "proactive" nature of the incorporation.

For example, suppose multiple friends in a newly-initiated group chat begin by discussing a particular baseball game. The automated assistant may detect that a broad topic of "sports" and narrower topics of "baseball" and the teams involved in the baseball game are being discussed. Additionally, the automated assistant may detect, e.g., based on search history associated with one participant and location history of another participant, that both participants are interested (or potentially are interested) in a particular basketball team. Even though basketball in general and the commonly-liked basketball team in particular have not yet been mentioned, because the topic of "sports" has been raised in the group chat, the automated assistant may proactively incorporate content related to the potentially shared-interest basketball team into the group chat. In some implementations, the proactively-incorporated content may include, for instance, content obtained from publicly available sources. For example, the automated assistant may select and proactively incorporate into the group chat a message such as "<your shared-interest team> has a game tonight at 7:30 PM on <network>."

Some group chats may be persistent in that participants can join, leave, and then later rejoin the group chat. Indeed, some group chats may operate like a forum or message board that persists and can be revisited later. Accordingly, it is not required that automated assistants only proactively incorporate content when all participants are actively contributing to and/or participating in the group chat. In some implementations, automated assistants may incorporate messages into the group chat just as though they were themselves participants, even if no other participants are currently active in the group chat. This may occur, for instance, when new information becomes available, e.g., from one or more news sources. Other human participants may be notified of content proactively-incorporated by automated assistants in manners similar to how they might be notified that any other human participants contributed to the group chat. For example, a graphical icon associated with the group chat may be presented, e.g., on a home screen of a participant's smart phone, that includes a number of new (e.g., unread by that particular participant) messages.

As noted above, newly-initiated group chats may lack sufficient content alone to enable automated assistants to proactively incorporate content in an effective manner. One or more terms may be raised by participants that are susceptible to multiple interpretations. For example, suppose multiple non-American users begin a group chat discussing the topic "football." This topic could be interpreted as American Football (e.g., the NFL) or traditional football (which is called "soccer" in the United States). Without more information, an automated assistant may proactively incorporate irrelevant information into the group chat. That is why, as noted above, with relatively newly established group chats, automated assistants may also utilize individual participant profiles to determine shared interests, which then may be used to select content to proactively incorporate into a group chat. For example, in the scenario described above, techniques described herein could be used, for instance, to determine from position coordinates of the participants that the participants are located outside of the United States, and therefore, the topic of "football" likely pertains to a shared interest in traditional football, as opposed to American football.

However, as group chats mature, content selected based on shared participant interests may become less compelling and/or useful than content selected based on one or more topics of the group chat. Accordingly, in various implementations, an amount of influence shared participant interests have on selecting new content to proactively provide to the group chat participant may diminish based on a length of the message exchange thread. For example, the longer a temporal lifetime of the message exchange thread, the more heavily topics of discussion influence selection of content for proactive incorporation, relative to shared interests. Additionally or alternatively, the greater number of messages exchanged by multiple participants of the group chat, the more heavily topics of discussion influence selection of content for proactive incorporation, relative to shared interests. As more topics are raised and discussed, automated assistants may be better able to proactively provide content that is more likely to be well-received by the human participants.

In some implementations, participant profiles may be updated based on participant reactions to proactively provided content. For example, suppose a particular interest attributed to a participant is used to select proactively provided content, and the participant provides negative feedback in response to the proactively provided content. In some implementations, the participant's profile may be updated to weaken or even eliminate the association between the participant and the interest.

In some implementations, a method performed by one or more processors is provided that includes: analyzing, by one or more automated assistants, one or both of content of a message exchange thread involving multiple human participants and one or more documents associated with the message exchange thread, wherein the automated assistant is not explicitly invoked by any of the participants; identifying, by one or more of the automated assistants, based on the analyzing, one or more topics pertinent to the message exchange thread; identifying, by one or more of the automated assistants, based on individual participant profiles associated with the participants, one or more shared interests of the participants, wherein each participant of the multiple participants is associated with an individual participant profile that includes information related to the participant; selecting, by one or more of the automated assistants, new content that is based both on the one or more pertinent topics and one or more of the shared interests of the participants; and proactively providing, by one or more of the automated assistants, the new content to one or more of the participants.

These and other implementations of technology disclosed herein may optionally include one or more of the following features.

In various implementations, the proactively providing may include proactively incorporating the new content into the message exchange thread. In various implementations, the proactive providing may cause one or more client devices of the participants to output the new content via one or more output devices. In various implementations, the new content may be output at one or more client devices of the participants outside of the message exchange thread.

In various implementations, the new content may include first new content, and the method may further include: selecting, by one or more of the automated assistants, after the proactively providing, second new content that is based on the one or more pertinent topics or one or more subsequent topics determined to be pertinent to the message exchange thread, wherein the second content is selected by one or more of the automated assistants without consideration of the shared interests of the participants; and proactively providing, by one or more of the automated assistants, the second new content to one or more of the participants.

In various implementations, the one or more shared interests of the participants may be identified based on search history associated with one or more of the individual participant profiles. In various implementations, the one or more shared interests of the participants may be identified based on location history associated with one or more of the individual participant profiles. In various implementations, an amount of influence the one or more shared interests of the individuals has on selecting the new content may be based on a length of the message exchange thread. In various implementations, the length of the message exchange thread may include a temporal lifetime of the message exchange thread and/or may be based on a count of messages exchanged by the multiple participants.

In various implementations, selecting the new content that is based both on the one or more pertinent topics and the one or more of the shared interests of the participants, may include: identifying a group of content candidates based on the one or more pertinent topics; and selecting the new content, from the group of content candidates, based on one or more of the shared interests of the participants. In various implementations, the one or more documents associated with the message exchange thread may include a meeting agenda or a calendar entry. In various implementations, selecting the new content may be further based on prior feedback received from one or more of the participants in response to content that was proactively provided previously.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
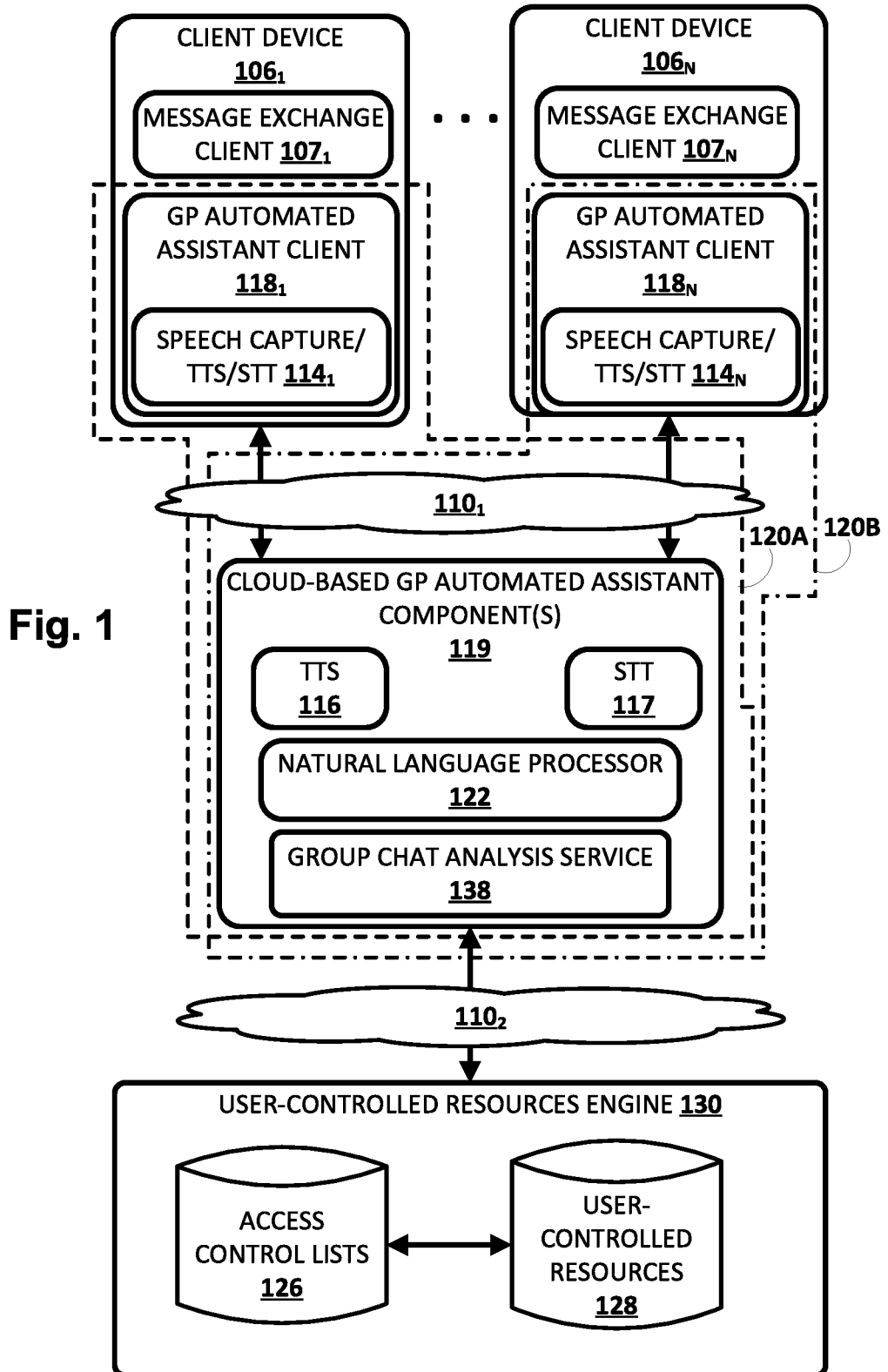
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of a general purpose ("GP") automated assistant client 118. One or more cloud-based GP automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at $110_1$.

As noted in the background, an instance of an automated assistant client 118, by way of its interactions with one or more cloud-based automated assistant components 119, may form what appears to be, from the user's perspective, a logical instance of a GP automated assistant 120 with which the user may engage in a human-to-computer dialog. Two instances of such a GP automated assistant 120 are depicted in FIG. 1. A first GP automated assistant 120A encompassed by a dashed line serves a first user 140A operating first client device $106_1$ and includes GP automated assistant client $118_1$ and one or more cloud-based automated assistant components 119. A second GP automated assistant 120B encompassed by a dash-dash-dot line serves a second user 140B operating another client device $106_N$ and includes GP automated assistant client $118_N$ and one or more cloud-based automated assistant components 119. It thus should be understood that each user that engages with a GP automated assistant client 118 executing on a client device 106 may, in effect, engage with his or her own logical instance of a GP automated assistant 120. For the sakes of brevity and simplicity, the term "automated assistant" as used herein as "serving" a particular user will refer to the combination of a GP automated assistant client 118 executing on a client device 106 operated by the user and one or more cloud-based automated assistant components 119 (which may be shared amongst multiple GP automated assistant clients 118).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with GP automated assistant 120 utilizing a plurality of client computing devices 106 that collectively from a coordinated "ecosystem" of computing devices. In some such implementations, GP automated assistant 120 may be considered to "serve" that given user, e.g., endowing GP automated assistant 120 with enhanced access to user-controlled content (e.g., resources, documents, etc.) for which access is controlled by the "served" user.

For example, in FIG. 1, a user-controlled resources engine 130 may be implemented on one or computing devices (which again may be collectively referred to as a "cloud") to control access to resources controlled by each user. In some implementations, user-controlled resources engine 130 may be operably coupled with one or more computing systems that implement GP automated assistant 120 via one or more local and/or wide area networks (e.g., the Internet) indicated generally at $110_2$. Additionally or alternatively, user-controlled resources engine 130 may be implemented in whole or in part on the same computing systems that implement GP automated assistant 120. In some implementations, user-controlled resources engine 130 may include one or more access control lists 126 that govern access to user-controlled resources 128. In various implementations, access control list 126 may indicate access rights regarding multiple types of user-controlled resources for each user. Access control lists 126 may take various forms, such as database entries or a list of access control entries, that include indications, for each user, of what content controlled by that user is accessible to others (including the others' automated assistants), how it is accessible (e.g., read, write, etc.), and so forth.

User-controlled resources 128 may include various data associated with each user. This data may include documents associated with the user (and in many cases, with one or more accounts of the user), such as documents the user stores on a so-called "cloud" drive." It may also include emails and other electronic correspondence (e.g., text messages, social media posts, etc.). In some implementations, user-controlled resources 128 may include behavior related to the user's behavior, such as search query history (e.g., search logs), past conversations with a GP automated assistant 120, browsing history, and so forth. User-controlled resources 128 may also include other resources associated with a user, such as a calendar, a reminder list, a shopping list, sensor data (e.g., position coordinate data produced by, for instance, a Global Positioning System, or "GPS," sensor), and so forth. As used herein, the terms "individual participant profile" and "participant profile" may refer generally to user-controlled resources 128 associated with a particular participant in a message exchange thread. Thus, for example, a participant's individual participant profile may include one or more position coordinates of the participant, data pertaining to browsing history of the participant, data pertaining to search history of the participant, documents (e.g., calendar entries, emails, etc.) controlled by the participant, etc.

As noted in the background, user-controlled resources 128 (or a "participant profile") associated with a particular user may be associated with a "user account" of the user. In some instances, a user may sign into his or her user account on one or more client devices (e.g., using various credentials such as a username/password, biometrics, etc.), thereby endowing a GP automated assistant 120 (including the locally-executing client 118 and any online components 119) that serves the user with access to these resources. In some cases, GP automated assistant 120 may gain access to user-controlled resources 128 by way of the associated user account. For example, when the user installs or first engages with GP automated assistant client 118 on a particular client device 106, the user may grant GP automated assistant 120 permission to access some or all of the user-controlled resources 128 controlled by the user. In other words, the user effectively grants GP automated assistant 120 access to user-controlled resources 128. In some cases, this may include modifying access control list 126 (or other similar security mechanism).

While user-controlled resources 128 is depicted in FIG. 1 as a single database, this is not to suggest that all user-controlled resources is stored in a single location. To the contrary, in many implementations, user-controlled resources may be stored (or otherwise available) in part on client devices 106 (e.g., sensor signals such as GPS, local documents, photos, media files, etc.), and/or may be distributed across a variety of cloud-based systems, each which may serve a different purpose (e.g., one set of one or more servers may provide email functionality, another set of one or more servers may provide calendar functionality, etc.).

Each of the client computing devices $106_{1-N}$ may operate a variety of different applications, such as a corresponding one of a plurality of message exchange clients $107_{1-N}$ and a corresponding one of a plurality of GP automated assistant clients $118_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with GP automated assistant 120, and so forth. In some implementations, one or more of the message exchange clients $107_{1-N}$ may be implemented via a webpage or other resources rendered by a web browser (not depicted) or other application of client computing device 106.

As described in more detail herein, GP automated assistant 120 engages in human-to-computer dialog sessions with one or more users via user interface input and output devices of one or more client devices $106_{1-N}$. In some implementations, GP automated assistant 120 may engage in a human-to-computer dialog session with a user in response to user interface input provided by the user via one or more user interface input devices of one of the client devices $106_{1-N}$. In some of those implementations, the user interface input is explicitly directed to GP automated assistant 120. For example, one of the message exchange clients $107_{1-N}$ may be a personal assistant messaging service dedicated to conversations with GP automated assistant 120 and user interface input provided via that personal assistant messaging service may be automatically provided to GP automated assistant 120. Also, for example, the user interface input may be explicitly directed to GP automated assistant 120 in one or more of the message exchange clients $107_{1-N}$ based on particular user interface input that indicates GP automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, GP automated assistant 120 may engage in a dialog session in response to user interface input, even when that user interface input is not explicitly directed to GP automated assistant 120. For example, GP automated assistant 120 may examine the contents of user interface input and engage in a dialog session in response to certain terms being present in the user interface input and/or based on other cues. In many implementations, GP automated assistant 120 may engage interactive voice response ("IVR"), such that the user can utter commands, searches, etc., and the automated assistant may utilize natural language processing and/or one or more grammars to convert the utterances into text, and respond to the text accordingly.

Each computing device depicted in FIG. 1 may include one or more memories for storage of data and software applications, one or more processors for accessing data and executing applications, and other components that facilitate communication over a network. The operations performed by one or more of the client computing devices $106_{1-N}$ and/or by GP automated assistant 120 may be distributed across multiple computer systems. GP automated assistant 120 may be implemented as, for example, computer programs running on one or more computers in one or more locations that are coupled to each other through a network.

As noted above, in various implementations, each of the client computing devices $106_{1-N}$ may operate a GP automated assistant client 118. In various embodiments, each GP automated assistant client 118 may include a corresponding speech capture/text-to-speech ("TTS")/speech-to-text ("STT") module 114. In other implementations, one or more aspects of speech capture/TTS/STT module 114 may be implemented separately from GP automated assistant client 118.

Each speech capture/TTS/STT module 114 may be configured to perform one or more functions: capture a user's speech, e.g., via a microphone (not depicted); convert that captured audio to text; and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke GP automated assistant 120—to text. Other speech input may be sent to cloud-based automated assistant components 119, which may include a cloud-based TTS module 116 and/or a cloud-based STT module 117.

STT module 117 may be configured to leverage the virtually limitless resources of the cloud to convert audio data captured by speech capture/TTS/STT module 114 into text (which may then be provided to natural language processor 122). TTS module 116 may be configured to leverage the virtually limitless resources of the cloud to convert textual data (e.g., natural language responses formulated by GP automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by GP automated assistant 120 may be provided to speech capture/TTS/STT module 114, which may then convert the textual data into computer-generated speech that is output locally.

GP automated assistant 120 (and in particular, cloud-based GP automated assistant components 119) may include a natural language processor 122, the aforementioned TTS module 116, the aforementioned STT module 117, and other components that are not depicted in FIG. 1. In some implementations, one or more of the engines and/or modules of GP automated assistant 120 may be omitted, combined, and/or implemented in a component that is separate from GP automated assistant 120.

In some implementations, GP automated assistant 120 generates responsive content in response to various inputs generated by a user of one of the client devices $106_{1-N}$ during a human-to-computer dialog session with GP automated assistant 120. GP automated assistant 120 may provide the responsive content (e.g., over one or more networks when separate from a client device of a user) for presentation to the user as part of the dialog session. For example, GP automated assistant 120 may generate responsive content in in response to free-form natural language input provided via one of the client devices $106_{1-N}$. As used herein, free-form input is input that is formulated by a user and that is not constrained to a group of options presented for selection by the user.

Natural language processor 122 of GP automated assistant 120 processes natural language input generated by users via client devices $106_{1-N}$ and may generate annotated output for use by one or more other components of GP automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

As noted above, in various embodiments, techniques are described herein for analyzing, by one or more automated assistants (e.g., GP automated assistant 120 and/or domain-specific bots, etc.), one or both of content of a message exchange thread involving multiple human participants and one or more documents associated with the message exchange thread; identifying, by one or more of the automated assistants, based on the analyzing, one or more topics pertinent to the message exchange thread; identifying, by one or more of the automated assistants, based on individual participant profiles associated with the participants, one or more shared interests of the participants, wherein each participant of the multiple participants is associated with an individual participant profile that includes information related to the participant; selecting, by one or more of the automated assistants, new content that is based both on the one or more pertinent topics and one or more of the shared interests of the participants; and proactively providing, by one or more of the automated assistants, the new content to the participants. In various implementations, all of these operations may be performed even though the automated assistant is not explicitly invoked by any of the participants.

In some implementations, GP automated assistant 120, and in particular cloud-based automated assistant components 119, may include a group chat analysis service 138 (e.g., any combination of hardware and software) that is configured to perform one or more of the above-described operations. For example, group chat analysis service 138 may analyze various signals associated with a particular group chat, such as content of the group chat and/or documents associated with the group chat. Additionally, group chat analysis service 138 may consult with user-controlled resources engine 130 to identify shared interests of multiple participants of the group chat. Based on these data, group chat analysis service 138 (and more generally, GP automated assistant 120) may select new content to proactively provide to the group chat participants, even without GP automated assistant 120 having been invoked or invited to joining the group chat as a participant. While shown as integral with GP automated assistant 120, in some implementations, group chat analysis service 138 may be implemented entirely separately from GP automated assistant 120. In some implementations, a single group chat analysis service 138 may be deployed in a one-to-many relationship with a plurality of GP automated assistants 120.

Figure 2:
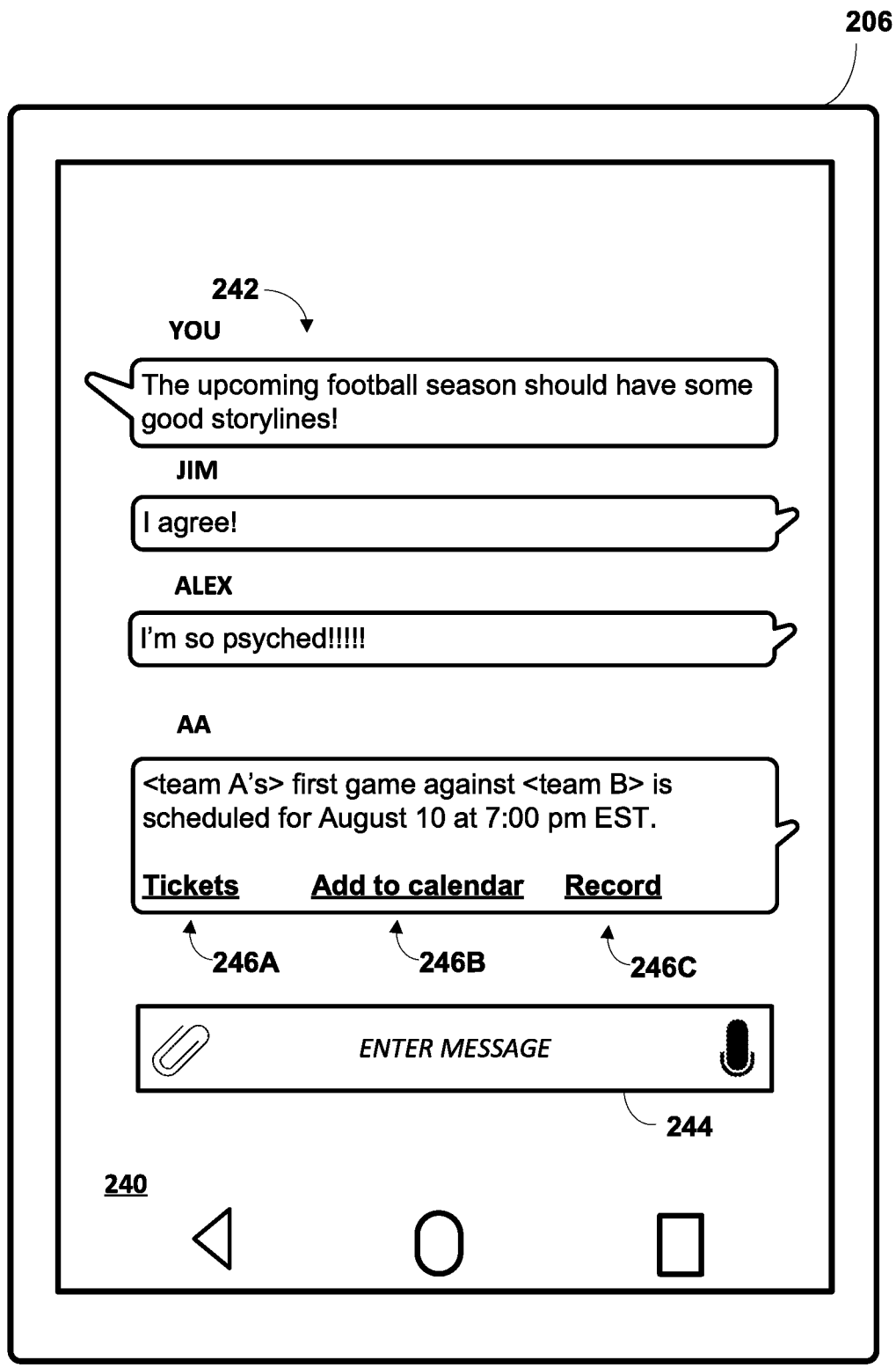
FIGS. 2, 3, and 4 depict example group chats involving multiple participants in which disclosed techniques may be employed, in accordance with various implementations.

FIG. 2 depicts an example group chat with three participants: a user ("YOU" in FIG. 2) that operates a client device 206 (which in this example is a smart phone or tablet but that is not meant to be limiting) and two other users, Jim and Alex. Client device 206 includes a touchscreen 240, a transcript 242 of a message exchange thread (i.e. group chat) between the participants, and an input field 244 that may receive text, speech-to-text, or other types of input (e.g., images) from the user that operates client device 206.

In the example of FIG. 2, the user that operates client device 206 inputs (e.g., by typing or speaking) the following message: "The upcoming football season should have some good storylines!" Jim responds "I agree!" and Alex responds "I'm so psyched!" Meanwhile, GP automated assistant 120 (e.g., by way of group chat analysis service 138) may determine whether to proactively incorporate content into the group chat, and if so, what content to incorporate. For example, in some implementations, GP automated assistant 120 may analyze content of the group chat and identify, based on the analyzing, one or more topics discussed by the participants. In this example, the group chat is relatively new, so relatively few topics such as "sports" and "football" have been raised. However, "sports" is a relatively high level topic that encompasses myriad sub-topics such as specific sports, leagues, teams, players, games, etc. A person may be a fan of one sport (e.g., baseball) without having any interest whatsoever in another sport (e.g., auto racing). And even the topic "football" is ambiguous in that it could refer to American Football (e.g., the National Football League, college or high school football, "pigskin," etc.) or football as much of the rest of the world thinks of it, which in the United States is usually referred to as "soccer."

Without additional information, GP automated assistant 120 may not be in a position to proactively incorporate content that likely will be well-received by the group chat participants. Accordingly, in various implementations, GP automated assistant 120 may identify, based on individual participant profiles associated with the participants of the group chat, one or more shared interests of the participants. As noted above, in some implementations, these individual participant profiles may be provided by user-controlled resources engine 130 in accordance with permissions stored in access control list 126. In this example, suppose the respective participant profiles indicate that each group chat participant, or in some cases at least a majority of the group chat participants, are located inside of the United States. In various implementations, GP automated assistant 120 may use this information to disambiguate "football" to "American Football."

In addition, GP automated assistant 120 may ascertain from the respective participant profiles that each participant, or in some cases a majority of the participants, is interested in a particular American Football team, "team A" (enclosed in braces in FIG. 2 because it is a hypothetical team). Accordingly, GP automated assistant 120 may have enough information to intelligently select content to proactively incorporate into the group chat. In the example of FIG. 2, GP automated assistant 120 ("AA" in FIG. 2) incorporates the statement "<team A's> first game against <team B> is scheduled for Aug. 10 at 7:00 pm EST." GP automated assistant 120 may also incorporate other types of content, such as hyperlinks that when selected cause a web browser to open a document associated with a network address, or so-called "deeplinks" that when selected cause another application installed on client device 206 to open, e.g., in a predetermined state. For example, in FIG. 2, a first graphical element 246A comprises a hyperlink or deeplink to a web page or pre-loaded application that a user may operate to procure tickets to the game. A second graphical element 246B comprises a hyperlink or deeplink that is selectable by the user to add the game to his or her calendar. A third graphical 246C element comprises a hyperlink or deeplink that is operably by the used to cause the game to be recorded, e.g., by a digital video recorder ("DVR").

GP automated assistant 120 is not limited to proactively incorporating new content into a group chat. In various implementations, GP automated assistant 120 may provide new content to participants using other interfaces and/or output modalities. In some implementations, once one or more shared interests and/or conversation topics are identified, new developments related to those shared interests/topics (e.g., news stories) may be proactively provided, e.g., to one or more client devices operated by the participants using other interfaces and/or output devices. For example, sometime after the group chat conversation depicted in FIG. 2, one or more GP automated assistants 120 serving one or more of the participants may determine that new content is available that pertains to the shared interest. This content may be provided to the participants as, for example, text messages, notifications (e.g., on a lock screen), via graphical "cards," audible output, haptic output, etc.

It is not required that each participant receive the proactively provided new content in the same manner, nor is it necessary that each participant necessarily receive the new content at all (e.g., a participant may elect not to receive such notifications). In some implementations, whether a particular group chat participant receives new content may depend on a variety of factors, such as how the participant has consumed such notifications in the past (e.g., clicked on them, rejected them by swiping them away, etc.) and/or based on feedback from the participant. Even in scenarios in which GP automated assistant 120 proactively incorporates new content into a group chat that is not currently active (e.g., no participants currently have the group chat application open), the participants may nonetheless receive notification, e.g., as a number in parenthesis or other symbol within or adjacent a graphical element that represents the group chat or the application in which the participant accesses the group chat.

In some implementations, new content that is proactively provided to a participant may also be used as signals for other activities engaged in by the participant using a computing device. For example, in some implementations, alternative query suggestions that are selected for provision to a participant when the participant begins inputting text into a search field may be influenced (e.g., ranked) by new content that is provided to the participant using techniques described herein. Similarly, proactively provided new content may be used to rank search results presented to the user and/or suggestions for media content. For example, the next song played back by a participant's streaming music service may be selected based at least in part on new content provided to the participant using techniques described herein.

In some implementations, a participant profile may be adjusted based on feedback from the participant in response to proactively provided content. For example, suppose multiple participants in a group chat are determined to share a particular interest. This may be determined, for example, from search histories and browsing histories of the respective users. Now, suppose that a client device 106 operated by a given participant of the group chat participants is also often operated, for instance, by other members of the given participant's family with different interests. These different interests may nonetheless be attributed to the given participant, even if the given participant in fact does not have those interests. Consequently, those interests may be detected and, if shared with other participants in the group chat, used to select content to proactively provide to all the group chat participants. The given participant may reject this content, e.g., by swiping it away, or by providing more explicit negative feedback (e.g., clicking on a "not helpful" button). That negative feedback may then be used to modify the given participant's profile to exclude that interest.

As noted above, and demonstrated by FIG. 2, newly-initiated group chats may lack sufficient content alone to enable automated assistants (GP automated assistant 120 and/or one or more domain-specific bots) to proactively incorporate content in an effective manner. One or more terms may be raised by participants that are susceptible to multiple interpretations. Without more information, irrelevant information may be proactively incorporated into the group chat. That is why, as noted above, with relatively newly established group chats, individual participant profiles may also be utilized to determine shared interests, which then may be used to select content to proactively provide to group chat participants.

However, as group chats mature, content selected based on shared participant interests may become less compelling and/or useful than content selected based on one or more topics of the group chat. Accordingly, in various implementations, an amount of influence shared participant interests have on selecting new content to proactively incorporate into the group chat may diminish based on a length of the message exchange thread. For example, the longer a temporal lifetime of the group chat, or the greater number of messages in the group chat, the more heavily topics of discussion may influence selection of content for proactive incorporation, relative to shared interests. As more topics are raised and discussed, GP automated assistants 120 and/or domain-specific bots may be better able to proactively incorporate content that is more likely to be well-received by the human participants.

Figure 3:
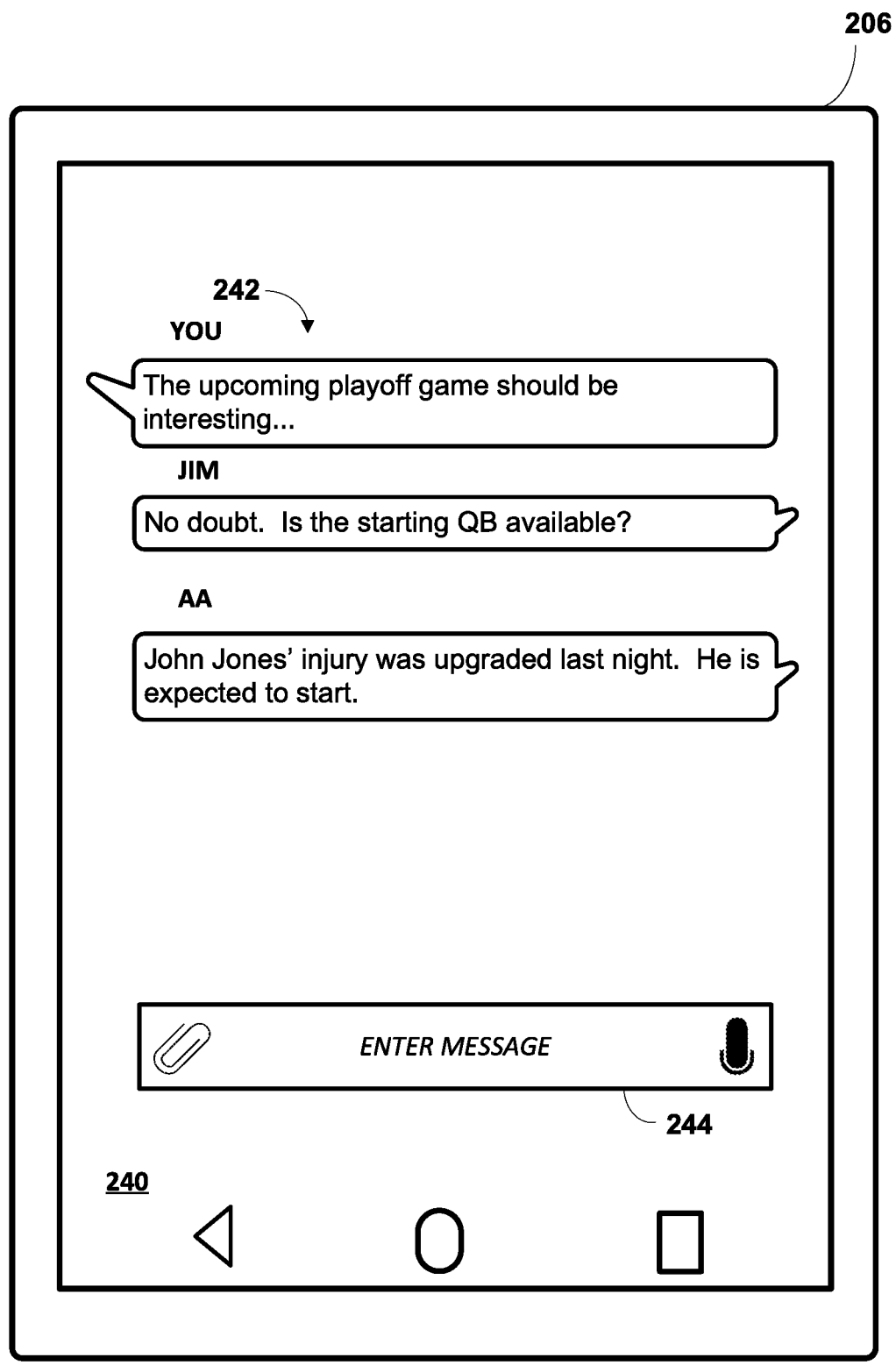

FIG. 3 demonstrates one example of the type of new content that may be proactivity incorporated into a group chat (or otherwise pushed to group chat participants) as the group chat matures. Client device 206 may be the same user's client device as was depicted in FIG. 2. Suppose that for this example, a number of weeks or months have passed since the group conversation depicted in FIG. 2 occurred, such that the NFL season has reached the playoffs. Suppose further that <team A>, the team identified from the shared interests of the participants in FIG. 2, has already been eliminated from contention. Consequently, topics pertaining to <team A> may not be as pertinent at this point in the season.

The user begins the conversation in FIG. 3 with the statement, "The upcoming playoff game should be interesting . . . ." Jim replies, "No doubt. Is the starting QB available?" At this point, it is not clear which playoff game the participants are discussing because, for instance, there may be multiple upcoming playoff games, e.g., one in the National Football Conference ("NFC") and another in the American Football Conference ("AFC"). Thus, the phrase "starting QB" is also ambiguous. However, topics raised during this subsequent point of the group chat, such as "playoff game," "quarterback," etc. may be added to an ongoing list of topics that have been covered in the group chat previously (e.g., "American Football," "team A," etc.).

Based at least in part on these newly-raised topics, GP automated assistant 120 ("AA" in FIG. 3) may proactively incorporate new content into the group chat. In some implementations, GP automated assistant 120 may search for and retrieve new content candidates based on the new topics, and then may rank the retrieved new content candidates on a variety of signals, such as older topics of conversations and/or shared user interests. In this example, GP automated assistant 120 may disambiguate between the multiple upcoming playoff games based on one or more shared interests of the participants. Suppose <team A> is in the NFC. GP automated assistant 120 may disambiguate between an upcoming AFC playoff game and an upcoming NFC playoff game based on this fact. Then, GP automated assistant 120 may be able to disambiguate the phrase "starting QB" to two potential quarterbacks: the starting quarterbacks of the teams playing in the NFC playoff game. The term "available" may turn up in news stories and/or other data sources in relation to one of the NFC playoff teams, e.g., because that team's quarterback (John Jones) may have been injured recently, and there may be some question of him starting. This may enable GP automated assistant 120 to further disambiguate between the two NFC playoff teams. Accordingly, GP automated assistant 120 may proactively incorporate the following statement into the group chat: "John Jones' injury was upgraded last night. He is expected to start."

Figure 4:
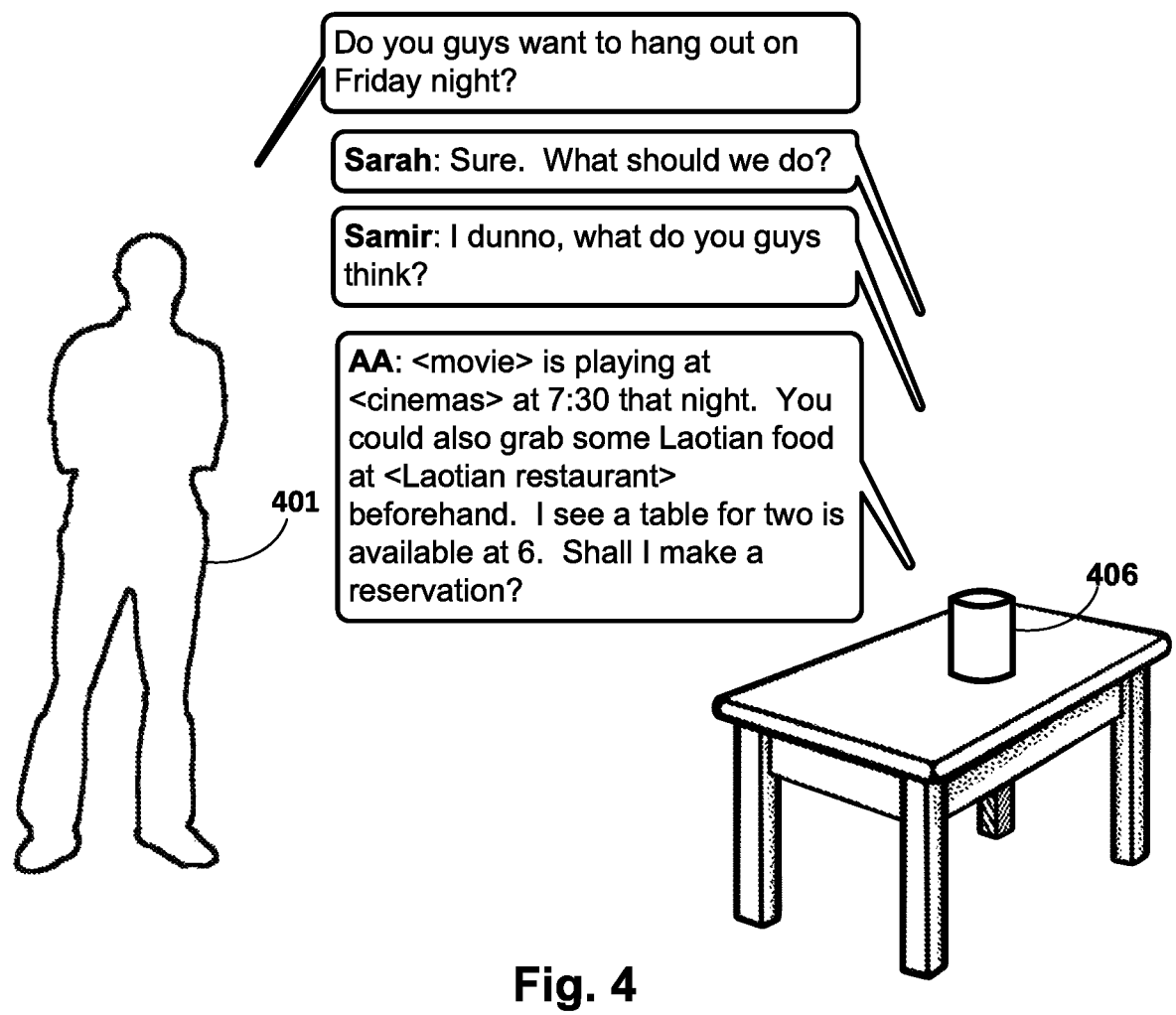

FIG. 4 depicts another example of techniques described herein being implemented, this time in the context of an audio conversation between multiple users (e.g., an "audio group chat" or "online teleconference"). In this example, a participant 401 is engaged in the audible conference with two other participants, Sarah and Samir, via a client device 406 that takes the form of a standalone interactive speaker. The multi-participant audio exchange may be implemented in various ways, such as using voice over IP, standard telephone infrastructure, or using other techniques often used to facilitate online conferences. In some implementations, client device 406 may be operating an instance of GP automated assistant client 118, thereby allowing user 401 to engage in dialog with a GP automated assistant 120. However, this is not required, and in some implementations, other types of automated assistants, such as the previously-described "bots" that often are tailored to specific domains, may be implemented in whole or in part on client device 406, and/may be implemented on one or more remote computing systems (e.g., the cloud) such that content provided by the bot is audibly output at client device 406.

In various implementations, and subject to the participants providing permission (e.g., beforehand), one or more automated assistants or other components, which may or may not be cloud-based, may receive each user's audio inputs and convert those inputs into text, such that a transcript of the participants' conversation is available for analysis using techniques described herein. For example, the participants may join the audio group chat of FIG. 4 using a particular application configured for such audio group chats. The application may (audible or visually) notify the participants that their conversation will be transcribed and used for analysis. In some implementations, the participants may have the option of opting out such transcription, e.g., as a group and/or on an individual participant basis. If all participants opt out, then no transcription may be made of the conversation. If only one participant opts out and one or more other participants opt in (or do not opt out), then any messages provided by the opted-out participant may not be transcribed/analyzed, and any analysis may be limited to messages provided by the other participant(s).

In addition, in some implementations, one or more participants may be opted out automatically, without their having to provide explicit instructions. For example, if a particular participant consistently/frequently provides negative feedback in response to new content proactively provided using techniques described herein, then that participant may be opted out of transcription/analysis automatically. In some implementations, participants may be automatically opted out on a domain specific basis. For example, suppose a particular participant in a group chat has no interest in tennis, but that multiple other participants are keenly interest in tennis. In some implementations, only messages provided by participants with an interest in tennis may be transcribed/analyzed; messages provided by the disinterest participant may not. In some such implementations, new tennis-related content that is proactively provided to other participants of the group chat may not be provided to the disinterested user (even in the message exchange thread itself; the disinterested user's message exchange client 107 may simply not receive the new content for display, and/or may elect not to present it).

While the concepts of opting in/out explicitly or automatically are being described with reference to FIG. 4 (audio group chat), this is not meant to be limiting. These concepts may be equally applicable in other types of group chats, such as the purely textual group chat illustrated in FIGS. 2-3. Moreover, it is not necessary that every participant in a group chat be using the same input/output modalities. For example, participant 401 may engage in the group chat using audio input (captured by a microphone) and audio output (one or more speakers). However, other participants, such as Sarah and/or Samir in FIG. 4, may participate in the group chat using textual means, such as message exchange client. This may be possible because, as noted above, any audio message incorporated into the group chat may be transcribed (assuming the speaking participant does not opt out).

In FIG. 4, participant 401 begins by asking, "Do you guys want to hang out Friday night?" Sarah replies, "Sure. What should we do?" Samir replies, "I dunno, what do you guys think?" At this point in the voice group chat, group chat analysis service 138 does not have many conversational topics to work with, other than the vague fact that the participants are making plans for Friday night. Accordingly, GP automated assistant 120 may consult with user-controlled resources engine 130 to analyze participant profiles with each of the participants to identify shared interests in, for instance, "movies" and "Laotian cuisine." Based on these shared interest (and in some cases on geographic proximity of the participants determined from participant profiles), GP automated assistant 120 may identify new content for incorporation into the audio group chat. For example, GP automated assistant 120 may search publicly-available data sources for information pertaining to local movie show times and available reservations at nearby Laotian restaurants. Consequently, GP automated assistant 120 proactively provides the following new content: "<movie> is playing at <cinemas> at 7:30 that night. You could also grab some Laotian food at <Laotian restaurant> beforehand. I see a table for two is available at 6. Shall I make a reservation?" Because client device 406 is an interactive standalone speaker (which may or may not include any display capabilities), this new content may be provided audibly by client device 406, e.g., via one or more speakers. However, if one or more of the other participants is engaged in the group chat textually, e.g., by way of a message exchange client 107, those one or more participants may receive the same new content in textual form.

In some implementations, new content may be selected, even in a relatively new group chat, based on signals in addition to or instead of shared interests determined from participant profiles. For example, multiple individuals may set up a group chat using enterprise chat software deployed, e.g., within a company or other organization. This enterprise chat software may enable individuals to associate group chats with particular documents and/or events. For example, one individual (group chat coordinator) may create a calendar entry for a meeting with one or more other individuals. By operating the enterprise chat software, the group chat coordinator may configure the calendar event to be associated with a group chat (newly-established for the meeting or preexisting). The group chat coordinator may also add various information to the calendar entry, such as proposed topics of conversation (e.g., an agenda), one or more attached documents, etc. This added information may be analyzed, e.g., by GP automated assistant 120, and used to select new content to proactively provide to the participants. In some implementations, the added information may include one or more topics extracted from a document associated with the group chat. Consequently, even early in a brand new group chat when few if any topics have been raised by participants, there may be sufficient preexisting topics for GP automated assistant 120 to intelligently select new content to proactively provide to participants.

Figure 5:
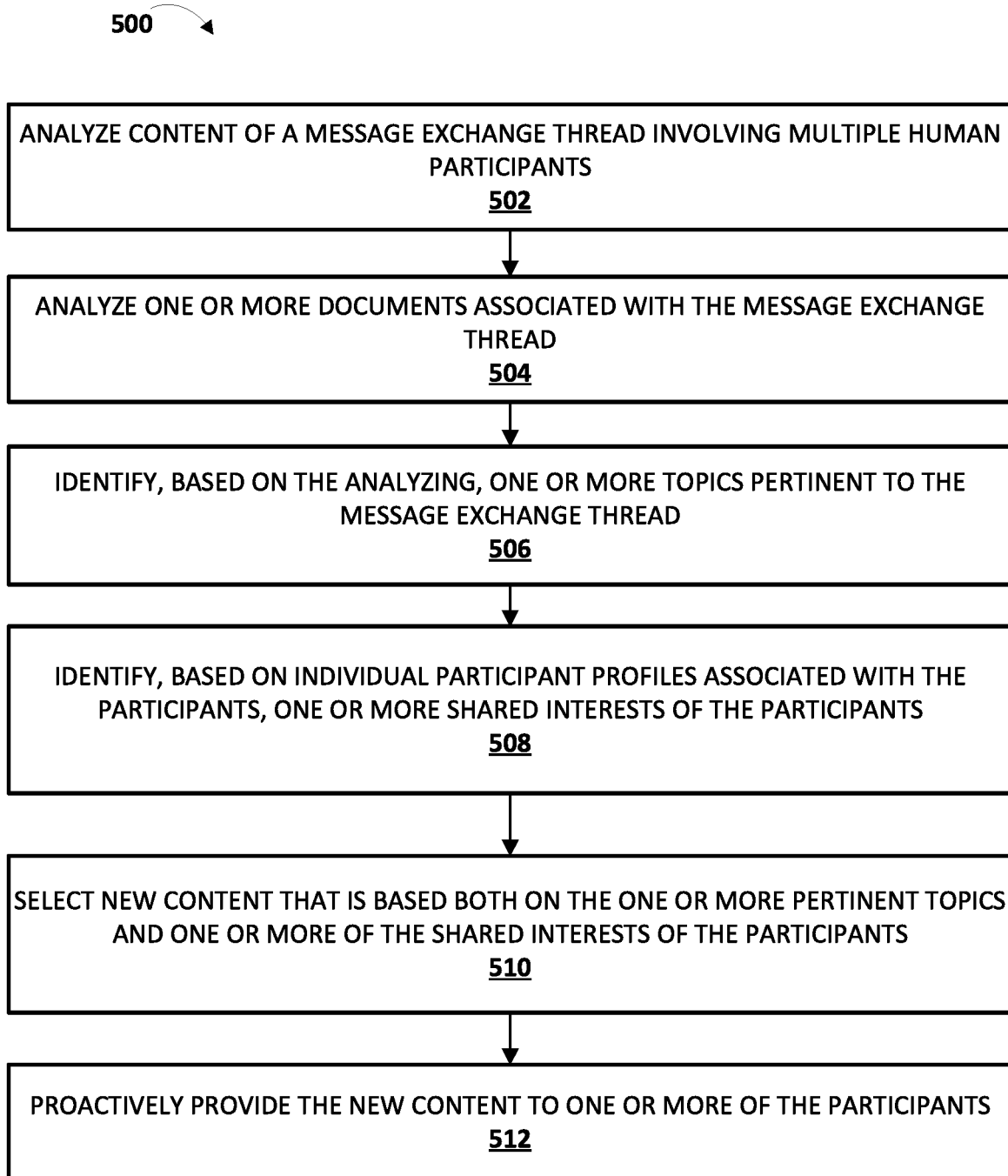
FIG. 5 depicts a flowchart illustrating an example method according to implementations disclosed herein.

FIG. 5 is a flowchart illustrating an example method 500 according to implementations disclosed herein. For convenience, the operations of the flow chart are described with reference to a system that performs the operations. This system may include various components of various computer systems, such as one or more components of GP automated assistant 120 (including group chat analysis service 138). Moreover, while operations of method 500 are shown in a particular order, this is not meant to be limiting. One or more operations may be reordered, omitted or added.

At block 502, the system may analyze, e.g., by way of one or more automated assistants 120 or other components such as group chat analysis service 138, content of a message exchange thread (e.g., a textual, audio, and/or audio-visual group chat) involving multiple human participants. At optional block 504, the system may analyze, e.g., by way of one or more automated assistants 120 or other components such as group chat analysis service 138, one or more documents associated with the message exchange thread. It should be understood that in some implementations, particularly when no documents are associated with the group chat, only the operations associated with block 502 may be performed.

At block 506, the system may identify, based on the analysis of block 502 and/or block 504, one or more topics pertinent to the message exchange thread. Various conventional techniques may be employed to determine topics of discussion in a message exchange thread and/or an associated document (e.g., agenda, calendar entry, etc.). In some implementations, one or more topic classifiers (not depicted in FIG. 1) may be employed, e.g., on an ongoing basis using a sliding window of message exchange thread content, to identify one or more current topics of discussion. Topic classifiers may take the form of machine learning models (supervised or unsupervised) or rules-based models.

With machine learning-based topic classifiers, in some implementations, a topic classifier may be trained to provide output indicative of whether a particular topic is being discussed (e.g., binary output, or a probability). In other implementations, a topic classifier may be trained to provide output indicative of whether a plurality of different topics are being discussed. For example, a topic classifier may be configured to provide output indicating likelihoods or confidences that a plurality of different topics are being discussed. In some implementations, only those topics that have likelihoods/confidences that satisfy one or more thresholds may be identified as topics of discussion. In other implementations, only the n highest likelihood/confidence topics may be identified as topics of discussion. Various known techniques may be employed for topic classification, including but not limited to expectation maximization, term frequency-inverse document frequency ("td-idf"), naïve Bayes classifiers, neural networks (e.g., instantaneously trained neural networks), support vector machines, various natural language processing approaches (e.g., topic segmentation), sentiment analysis, etc.

At block 508, the system may identify, e.g., based on individual participant profiles associated with the participants (e.g., information stored in user-controlled resources 128, locally on client devices 106, etc.), one or more shared interests of the participants. These shared interests may be identified based on a variety of different signals, including but not limited one or more position coordinates (e.g., current, historical, recent, etc.), browsing histories, searching histories, explicitly-set preferences, calendar entries (e.g., all or most participants scheduled to attend the same event(s)), reminder lists, shopping lists, etc.

It is not necessary that the same signal be used for each participant to identify an interest shared among most or all participants. For example, suppose a first participant in a group chat is associated with a position coordinate that is located in a particular city. Suppose a second participant has opted out of making position coordinates available, or that access control list 126 indicates that the other participants in the group chat (or group chat analysis service 138) lack sufficient permissions to access the second participant's position coordinate. In such a scenario, if the second participant's browsing history or search history (assuming these are available to group chat analysis service 138) indicate an interest in a particular sports team or other entities associated with the particular city, the second user may be assumed to share an interest in the particular city.

It is also not strictly necessary, at least in some implementations, that every single participant share an interest for that interest to be used to select new content to proactively provide to the participants in a group chat. For example, suppose the majority of participants in a group chat exhibit an interest in a particular city. Even if participant profiles associated with the remaining minority of other participants do not include, respectively, data that explicitly suggests that they share interest in the particular city, so long as there is not information that tends to contradict their interests in the particular city, that particular city may be deemed a shared interest of the group chat participants. In some implementations, multiple shared interests may be identified, and the identified shared interests may be ranked, e.g., based on the number of participants that share those interests. In some such implementations, only the n (positive integer) highest ranking shared interests may be considered.

Referring back to FIG. 5, at block 510, the system may select new content to be proactively provided to participants in the group chat. In some implementations, particularly when the group chat is relatively new and there are not sufficiently fleshed out topics to use as a sole source for intelligent selection of new content, the new content may be selected based on any pertinent topics that have been discussed (even if somewhat vague) in combination with the shared interests identified at block 508. In some implementations, the topics that are used may be selected from the group chat itself or from document(s) associated with the group chat, such as attachments (e.g., agendas), documents that are linked to (e.g., by a participant) within the group chat, calendar entries associated with the group chat, etc. As described above, new content may take a variety of forms, such as recent news items corresponding to one or more topics/shared interests. In fact, even after a group chat has become inactive (e.g., no participants are currently viewing the group chat), the system may nonetheless select new content, e.g., as it becomes available. For example, suppose multiple participants of a group chat discuss an upcoming game. After the game is complete, information related to the outcome of the game may be selected at proactively provided (in block 512 discussed below) to the participants.

At block 512, the new content selected at block 510 may be proactively provided to one or more of the participants. In some implementations, the new content may be incorporated into the group chat, e.g., as a message provided by GP automated assistant 120 or in some cases by a domain-specific bot. It should be understood that this does not necessarily require that the new content be pushed to each client device, particularly in scenarios in which the group chat takes the form of an online forum, e.g., on a website. In some implementations, the new content may be pushed to each client device, e.g., as a notification separate from the group chat or within a local transcript of the group chat. In some implementations, the notification may be presented as a visual "card" that the user can select to obtain more information and/or take further action related to the new content. And as noted above, all participants need not necessarily be provided the new content, e.g., if they opted out or are disinterested in the topic/shared interest to which the new content relates.

Figure 6:
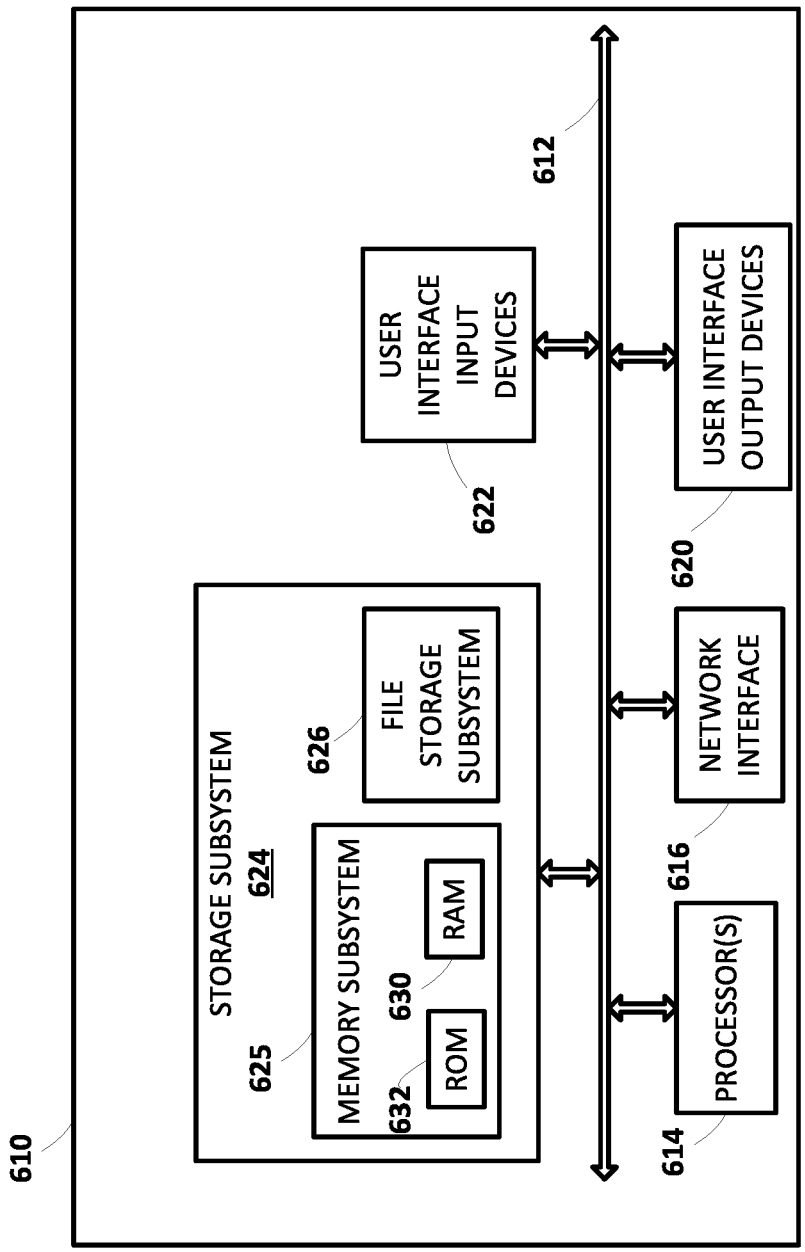
FIG. 6 illustrates an example architecture of a computing device.

FIG. 6 is a block diagram of an example computing device 610 that may optionally be utilized to perform one or more aspects of techniques described herein. In some implementations, one or more of a client computing device, user-controlled resources engine 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIG. 1.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method that is implemented on one or more processors, the method comprising:
    analyzing content of a message exchange thread involving multiple human participants;
    identifying, based on the analyzing, an ambiguous word or phrase incorporated into the message exchange thread by a participant, wherein the ambiguous word or phrase subject to multiple different interpretations;
    identifying, based on individual participant profiles associated with the participants of the same message exchange thread, one or more interests shared among at least a majority of the multiple participants of the same message exchange thread, wherein each participant of the multiple participants of the same message exchange thread is associated with an individual participant profile that includes interests of the participant;
    selecting, from the multiple interpretations, the interpretation of the ambiguous word or phrase that is most closely aligned with one or more of the interests shared among at least the majority of the multiple participants of the same message exchange thread;
    searching one or more data sources using the selected interpretation of the ambiguous word or phrase to identify responsive content, and
    proactively incorporating into the message exchange thread, by an automated assistant acting as a participant in the message exchange thread, at least some of the responsive content.

2. The method of claim 1, wherein the one or more shared interests of at least the majority of the multiple participants are identified based on search history associated with one or more of the individual participant profiles.

3. The method of claim 1, wherein the one or more shared interests of at least the majority of the multiple participants are identified based on location history associated with one or more of the individual participant profiles.

4. The method of claim 1, further comprising ranking search results that are to be provided to one or more of the multiple participants subsequent to the proactively incorporating based at least in part on the responsive content that was proactively incorporated into the message exchange thread.

5. The method of claim 1, further comprising:
    identifying, from input provided by one of the human participants in a search field subsequent to the proactively incorporating, a portion of a search query; and
    formulating an alternative query suggestion that is based on the responsive content that was proactively incorporated into the message exchange thread.

6. The method of claim 1, further comprising selecting, subsequent to the proactively incorporating, a media file for recommendation to one or more of the multiple participants, wherein the selecting is based on the responsive content that was proactively incorporated into the message exchange thread.

7. A system comprising one or more processors and memory operably coupled with the one or more processors, wherein the memory stores instructions that, in response to execution of the instructions by one or more processors, cause the one or more processors to:
    analyze content of a message exchange thread involving multiple human participants;
    identify, based on the analyzing, an ambiguous word or phrase incorporated into the message exchange thread by a participant, wherein the ambiguous word or phrase is subject to multiple different interpretations;
    identify, based on individual participant profiles associated with the participants of the same message exchange thread, one or more interests shared among at least a majority of the multiple participants of the same message exchange thread, wherein each participant of the multiple participants of the same message exchange thread is associated with an individual participant profile that includes interests of the participant;
    select, from the multiple interpretations, the interpretation of the ambiguous word or phrase that is most closely aligned with one or more of the interests shared among at least the majority of the multiple participants of the same message exchange thread;
    search one or more data sources using the selected interpretation of the ambiguous word or phrase to identify responsive content, and
    proactively incorporate into the message exchange thread, by an automated assistant acting as a participant in the message exchange thread, at least some of the responsive content.

8. The system of claim 7, wherein the one or more shared interests of at least the majority of the multiple participants are identified based on search history associated with one or more of the individual participant profiles.

9. The system of claim 7, wherein the one or more shared interests of at least the majority of the multiple participants are identified based on location history associated with one or more of the individual participant profiles.

10. The system of claim 7, further comprising ranking search results that are to be provided to one or more of the multiple participants subsequent to the proactively incorporating based at least in part on the responsive content that was proactively incorporated into the message exchange thread.

11. The system of claim 7, further comprising:
    identifying, from input provided by one of the human participants in a search field subsequent to the proactively incorporating, a portion of a search query; and
    formulating an alternative query suggestion that is based on the responsive content that was proactively incorporated into the message exchange thread.

12. The system of claim 7, further comprising selecting, subsequent to the proactively incorporating, a media file for recommendation to one or more of the multiple participants, wherein the selecting is based on the responsive content that was proactively incorporated into the message exchange thread.

13. At least one non-transitory computer-readable medium comprising instructions that, in response to execution of the instructions by one or more processors, cause the one or more processors to perform the following operations:
    analyzing content of a message exchange thread involving multiple human participants;

identifying, based on the analyzing, an ambiguous word or phrase incorporated into the message exchange thread by a participant, wherein the ambiguous word or phrase is subject to multiple different interpretations;

identifying, based on individual participant profiles associated with the participants of the same message exchange thread, one or more interests shared among at least a majority of the multiple participants of the same message exchange thread, wherein each participant of the multiple participants of the same message exchange thread is associated with an individual participant profile that includes interests of the participant;

selecting, from the multiple interpretations, the interpretation of the ambiguous word or phrase that is most closely aligned with one or more of the interests shared among at least the majority of the multiple participants of the same message exchange thread;

searching one or more data sources using the selected interpretation of the ambiguous word or phrase to identify responsive content, and proactively incorporating into the message exchange thread, by an automated assistant acting as a participant in the message exchange thread, at least some of the responsive content.

14. The at least one non-transitory computer-readable medium of claim 13, wherein the one or more shared interests of at least the majority of the multiple participants are identified based on search history associated with one or more of the individual participant profiles.

15. The at least one non-transitory computer-readable medium of claim 13, wherein the one or more shared interests of at least the majority of the multiple participants are identified based on location history associated with one or more of the individual participant profiles.

16. The at least one non-transitory computer-readable medium of claim 13, further comprising ranking search results that are to be provided to one or more of the multiple participants subsequent to the proactively incorporating based at least in part on the responsive content that was proactively incorporated into the message exchange thread.

* * * * *